United States Patent
Wrobley et al.

(10) Patent No.: US 7,182,569 B2
(45) Date of Patent: Feb. 27, 2007

(54) AUTO RACK DECK HINGE ARRANGEMENT

(75) Inventors: Eric Matthew Wrobley, Winder, GA (US); James P. Klag, Matteson, IL (US); Robert J. Recupido, Frankfort, IL (US); Robert J. Cencer, Tecumseh, MI (US)

(73) Assignee: Trinity Industries, Inc., Dallas, TX (US)

( * ) Notice: Subject to any disclaimer, the term of this patent is extended or adjusted under 35 U.S.C. 154(b) by 0 days.

(21) Appl. No.: 10/657,629

(22) Filed: Sep. 8, 2003

(65) Prior Publication Data

US 2004/0052603 A1    Mar. 18, 2004

Related U.S. Application Data

(62) Division of application No. 09/631,658, filed on Aug. 3, 2000, now Pat. No. 6,623,223.

(60) Provisional application No. 60/147,648, filed on Aug. 6, 1999.

(51) Int. Cl.
B60P 7/08    (2006.01)

(52) U.S. Cl. .................. 414/812; 410/24; 410/26; 410/27; 410/29

(58) Field of Classification Search ............... 410/24, 410/26–27, 29; 105/370, 372, 375; 414/812, 414/809
See application file for complete search history.

(56) References Cited

U.S. PATENT DOCUMENTS

| | | | |
|---|---|---|---|
| 2,929,339 A | 3/1960 | Schueder et al. | |
| 2,959,262 A | 11/1960 | Parker et al. | |
| 3,426,704 A | 2/1969 | Blunden | |
| 4,238,168 A | 12/1980 | Naves | |
| 4,248,557 A | 2/1981 | Roldness et al. | |
| 4,252,482 A | 2/1981 | Naves | |
| 4,759,669 A | 7/1988 | Robertson et al. | |
| 5,794,534 A | 8/1998 | Enderlein et al. | |
| 5,794,537 A * | 8/1998 | Zaerr et al. | |
| 6,325,579 B1 | 12/2001 | Jarvis | |
| 6,623,223 B1 * | 9/2003 | Wrobley et al. | 410/26 |

* cited by examiner

*Primary Examiner*—Stephen Gordon
(74) *Attorney, Agent, or Firm*—Fitch, Even, Tabin & Flannery

(57) ABSTRACT

A multilevel railway auto rack car for transporting automobiles is provided having at least one upper deck with end segments pivotable to accommodate the difference in height of corresponding upper decks of adjacent auto rack cars and facilitate loading of automobiles between cars. A pivoting assembly pivots the end segment between raised and lowered positions, as well as prevents the end segment from being inadvertently left in the lowered position.

4 Claims, 5 Drawing Sheets

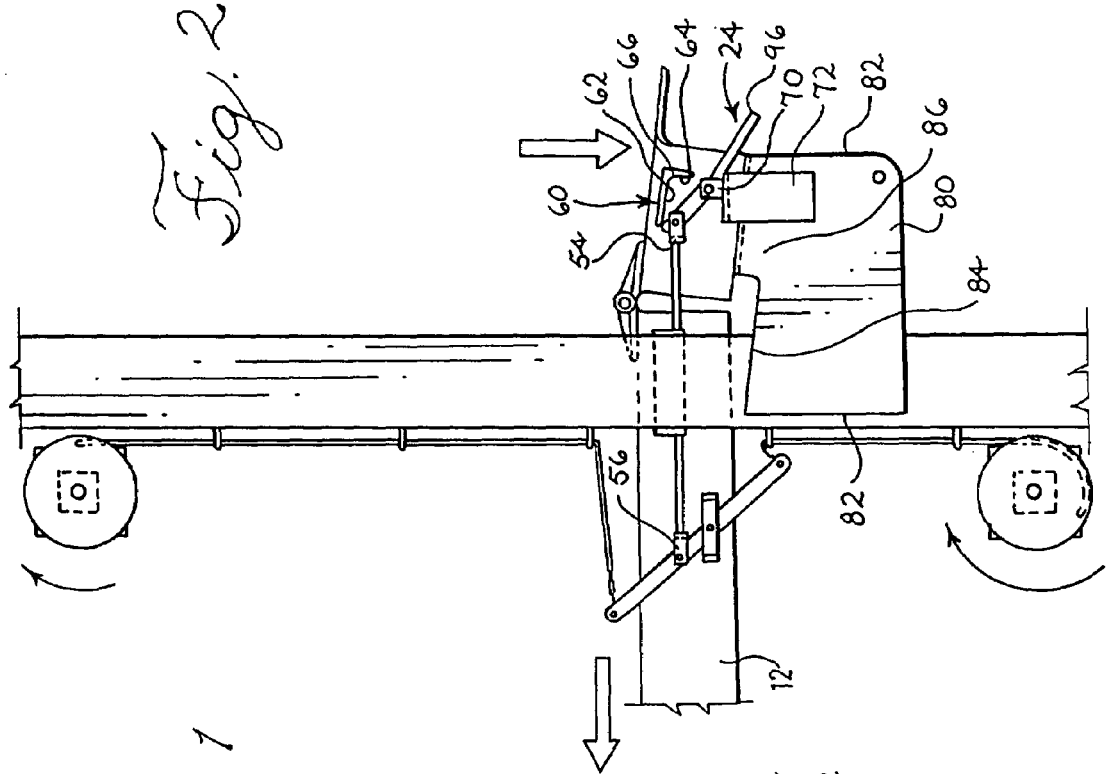
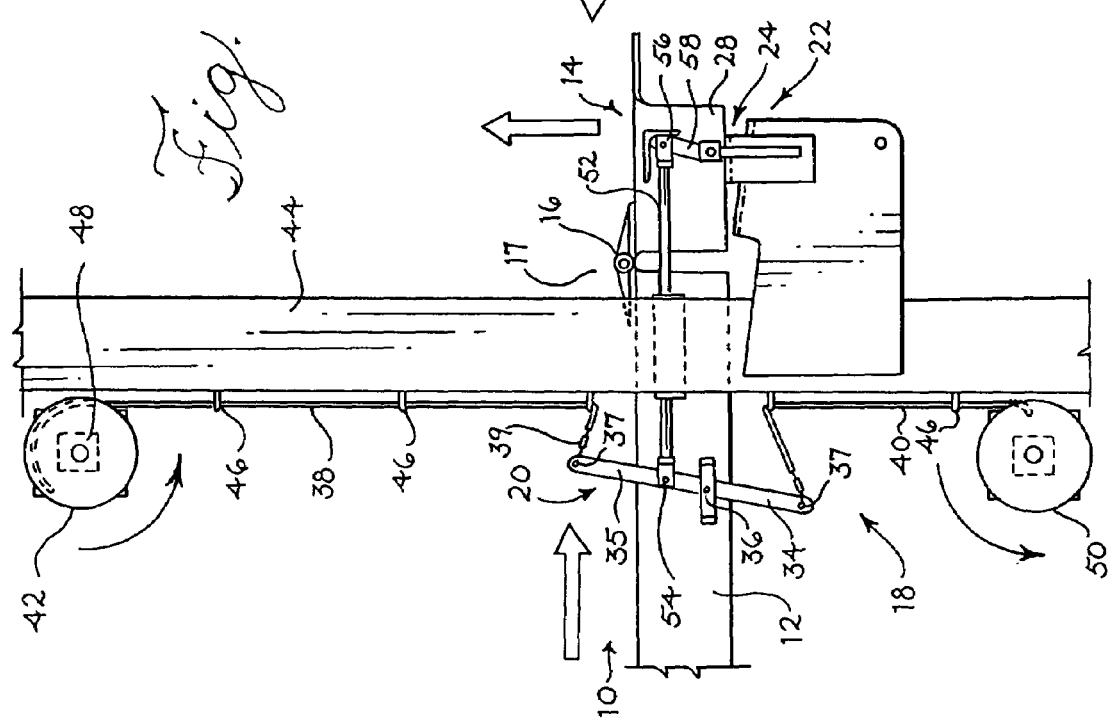

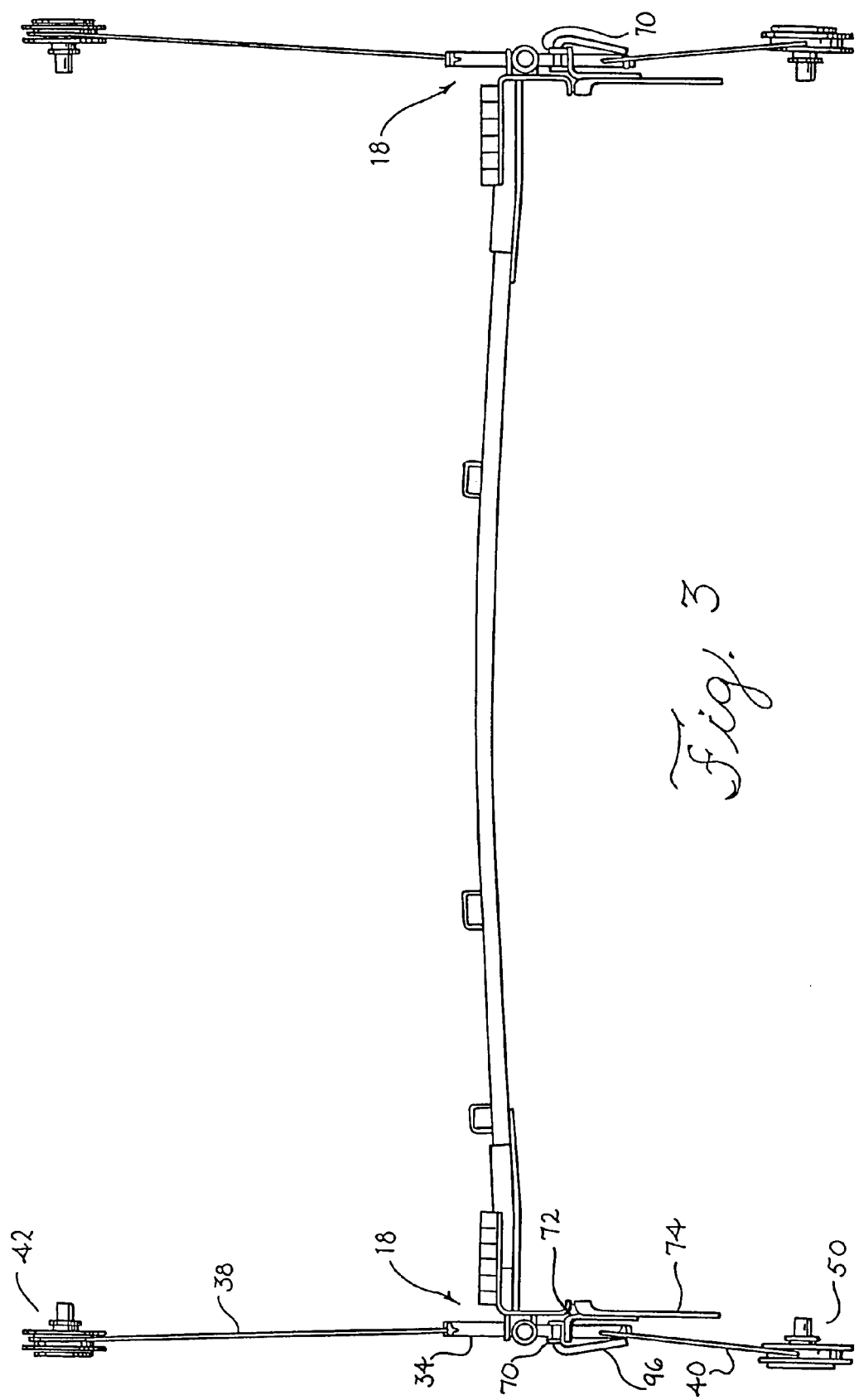

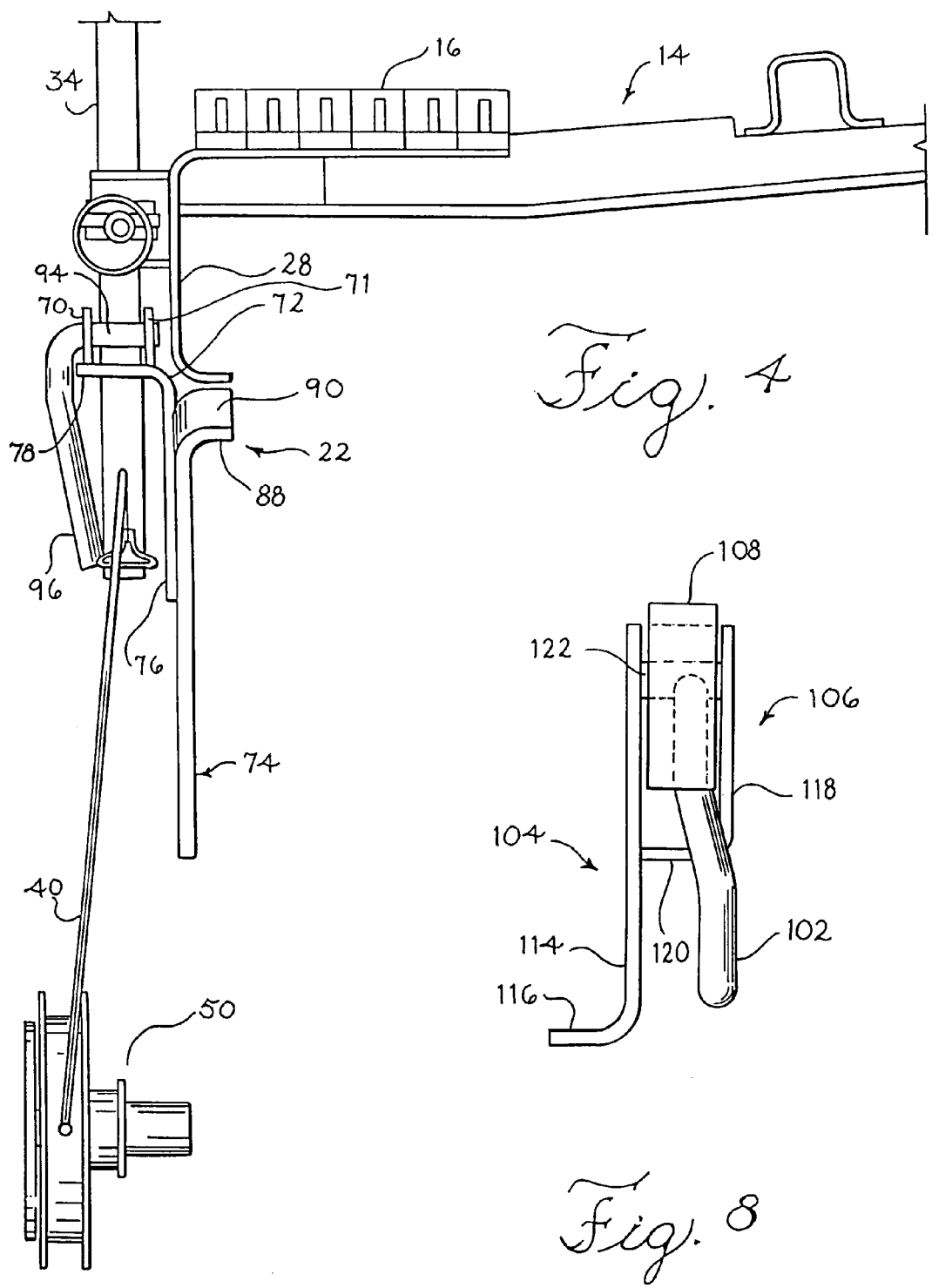

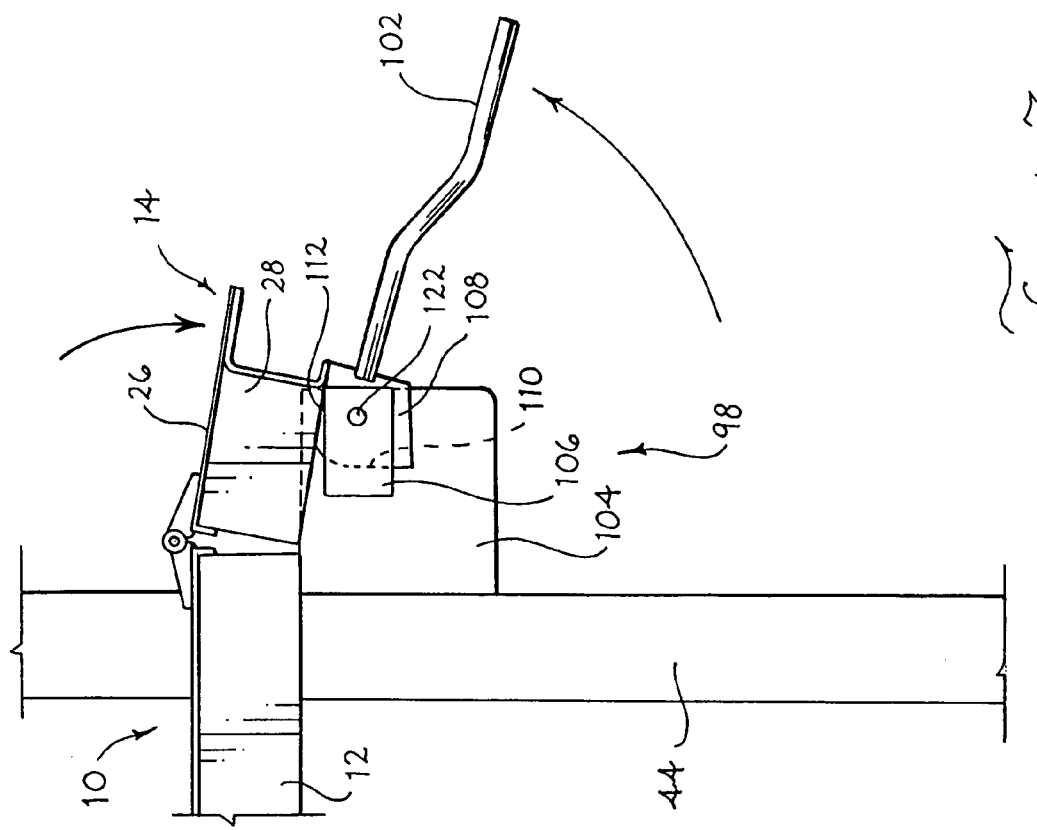
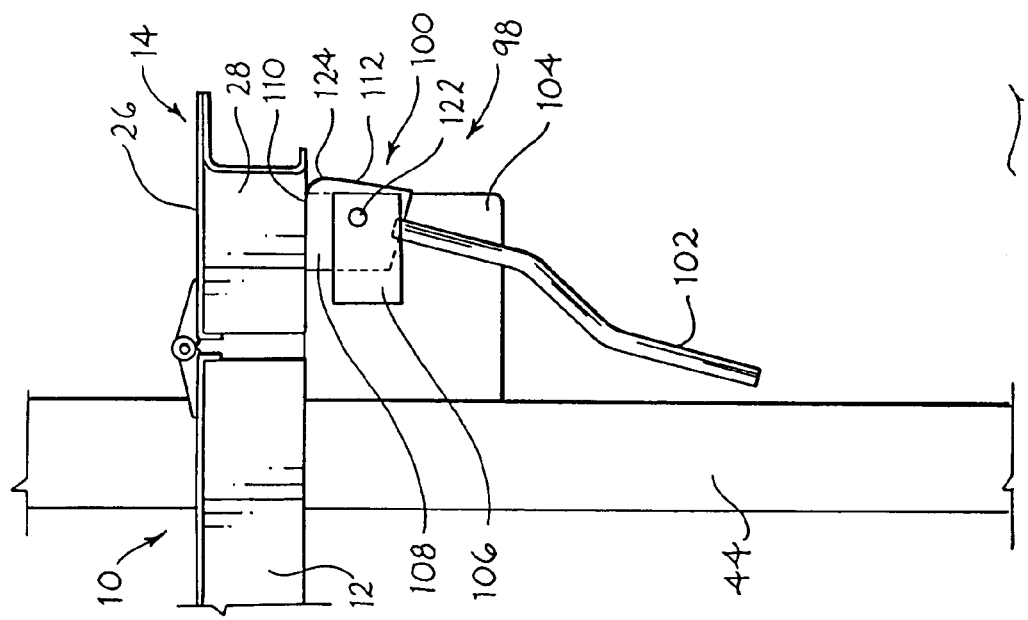

AUTO RACK DECK HINGE ARRANGEMENT

CROSS-REFERENCE TO RELATED APPLICATION

This application is a division of U.S. patent application Ser. No. 09/631,658, filed on Aug. 3, 2000, now issued as U.S. Pat. No. 6,623,223, which is based on, and claims benefit of U.S. Provisional Application Ser. No. 60/147,648, filed on Aug. 6, 1999 and entitled "Auto Rack Deck Hinge Arrangement."

The present invention generally relates to a railway car for transporting automobiles. More specifically, the invention relates to a multilevel auto rack car having at least one upper deck.

BACKGROUND OF THE INVENTION

Auto rack cars typically have two or three decks for carrying automobiles to maximize the number of automobiles being transported. As a result of the different designs for auto rack cars, including the number of decks, the heights of the upper decks relative to the lower deck may vary between designs.

Circus loading of the automobiles has long been employed as an efficient method of loading the automobiles onto the cars. In this method, the end doors of each of the cars are opened and bridge plates are connected to the upper decks. These bridge plates span between adjacent cars, thereby allowing automobiles to be quickly and easily driven through numerous cars during loading.

If the upper decks of adjacent cars are at different heights, it becomes difficult to securely connect the bridge plates to the decks. Moreover, as the height differential increases, the angle of the bridge plates also increases. Because of the short length of the bridge plates, even a small differential in deck heights may result in a steeply inclined bridge plate. It thus can become very difficult to drive the automobiles from one car to the next over the bridge plates.

BRIEF DESCRIPTION OF THE DRAWINGS

The present invention will be described in connection with the accompanying drawings wherein:

FIG. 1 is an elevational view from the side interior of a rail car of a deck assembly with the end of the deck in the raised position;

FIG. 2 is an elevational view of the deck assembly of FIG. 1 with the end of the deck in the lowered position;

FIG. 3 is front elevational view of the deck assembly of FIG. 1

FIG. 4 is an enlarged front elevational view of the deck assembly of FIG. 3 showing the pivoting assembly;

FIG. 6 is an elevational view from the side interior of the railcar of a deck assembly in accordance with a second embodiment of the present invention, showing the end of the deck in the raised position;

FIG. 7 is an elevational view of the deck assembly of FIG. 6 with the end of the deck in the lowered position, and FIG. 8 is an enlarged top plan view of the deck assembly of FIG. 6 showing the pivoting assembly when the end of the deck is in the raised position.

DETAILED DESCRIPTION OF THE PREFERRED EMBODIMENTS

Figure 5:
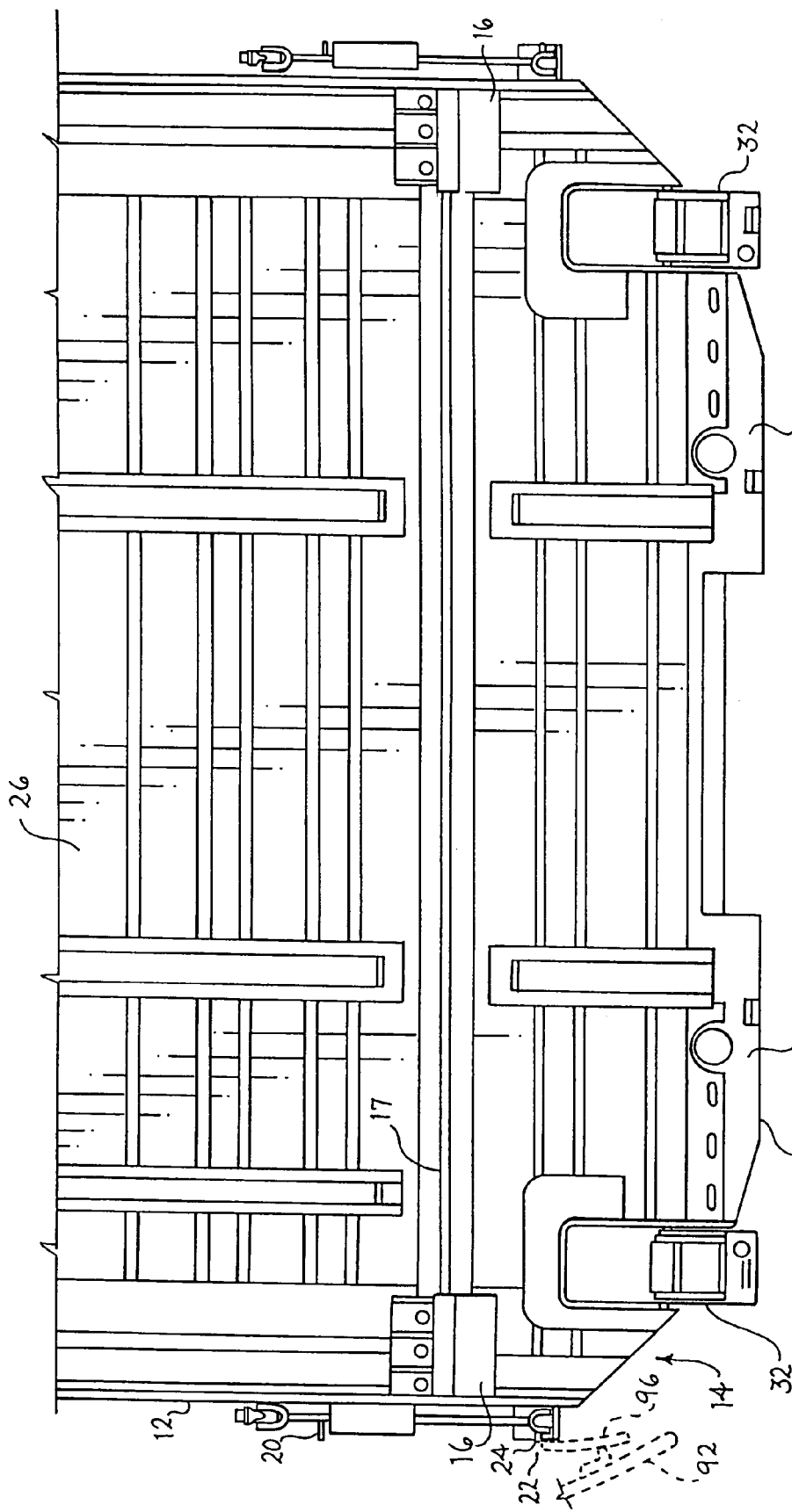
FIG. 5 is a top plan view of the deck assembly of FIG. 1.

The present invention generally is embodied in a multi-level auto rack car, with side walls and end doors that travel along an arcuate door track, having at least one upper deck having a stationary inner segment and end segments pivotable between a substantially horizontal raised position and a lowered position. Pivoting the end segment so that the end segment is inclined downwardly from the inner segment helps to reduce the height differential that may exist between decks of adjacent cars. Lowering the end segment facilitates connection of a bridge plate that is placed to span the distance between the upper deck and the corresponding upper deck of the adjacent auto rack car, as well as decreases the angle at which the bridge plate is inclined.

In the preferred embodiment, the auto rack car has one or more upper decks having a stationary inner segment and, at both ends of the deck, an end segment with pivoting assembly. The pivoting assembly facilitates mechanical movement of the end segment between the raised and the lowered position and preventing closing of the end doors when the end segment is lowered. The end segment and pivoting assembly are within the side walls and end doors of the auto rack car when the doors are closed.

Referring to FIGS. 1 and 2, an upper deck 10 of a multilevel auto rack car comprises a stationary inner segment 12 and an end segment 14 adjacent at least one end. The end segment 14 is spaced apart from and pivotally connected by pivot hinges 16 to the inner segment 12. The intersection of the inner segment 12 and end segment 14 defines a transverse pivot axis 17 about which the end segment 14 pivots. A pivoting assembly 18 is positioned adjacent to the deck 10 on each side to provide independent pivoting of each side of the end segment 14.

Referring now also to FIG. 5, the end segment 14 has a motor vehicle support surface 26 that is approximately two feet long and a lower support 28 beneath the support surface 26. The end segment 14 is pivotable about the transverse axis 17 between a raised, substantially horizontal position (FIG. 1) and a lowered, angled position (FIG. 2). In the lowered position the outermost edge 30 of the upper surface 26 is up to approximately three inches lower than when in the raised position.

The edge 30 of the end segment 14 generally angles inwardly so that the end segment 14 is disposed inwardly of the arcuately-shaped end doors (not shown) when the end doors are in the closed position. The end segment 14 includes along the edge 30 one or more movable bridge plate support members 32 and a fixed bridge plate support member 33 for mounting a bridge plate to the end segment 14. The bridge plate support members 32 and 33 are as described in U.S. patent application Ser. No. 09/145,503, filed Sep. 2, 1998, which is incorporated by reference herein in its entirety, or any similar means suitable for securing the bridge plate to the end segment 14.

A pair of pivot hinges 16 are attached to the motor vehicle support surface 26 of both segments 12 and 14 at or near both sides of the deck 10. The pivot hinges 16 are spaced far enough apart to allow passage of the tires of an automobile between the hinges 16 so that the tires do not roll directly over the hinges 16. The pivot hinges 16 facilitate pivoting of, as well as provide support for, the end segment 14.

In a first embodiment, the pivoting assembly 18 generally comprises a pivot arm assembly 20, a support assembly 22 and a lock-out mechanism 24. The pivot arm assembly 20 is positioned adjacent both sides of the upper deck 10 and includes a first, generally upright pivot arm 34 and a second, generally horizontal pivot arm 52. The pivoting assembly 18 also includes cables 38 and 40, spools 42 and 50 and a cam mechanism 58.

The first pivot arm 34 is rotatably mounted with a pin 36 or similar fastener at a fixed pivot point positioned intermediate the lower end and the midpoint of the pivot arm 34. The pivot arm 34 may be mounted to the deck at the stationary inner segment 12 or to the interior of the side wall. The first pivot arm 34 has a generally rectangular cross-section and rounded ends and is positioned with the wider sides 35 parallel to the deck 10. An upper cable 38 is-connected to the first pivot arm 34 at a position near or at the upper end of the first pivot arm 34, and a lower cable 40 is connected at a position near or at the lower end of the first pivot arm 34.

The upper cable 38 extends from the pivot arm 34 to a spool 42, or other rotary means around which the cable 38 can be wound, which is mounted at a fixed location above the pivot arm 34. The end of the cable 38 is looped through an opening 37 on the pivot arm 34 and secured with a fitting 39 or is otherwise connected to the pivot arm 34 in such a way to allow the pivot arm 14 to rotate smoothly without interference from the cable 38. Two or more eye bolts 46, or other ring-like members, mounted on a post 44 at the side wall slidably secure the cable 38 to the post 44 between the first pivot arm 34 and the spool 42.

A bore 48 through the center of the spool 42 is shaped to accommodate a key which can be inserted into the bore 48 in order to manually rotate the spool 42 to wind the cable 38 around the spool 42, thereby engaging the pivoting assembly. Typically, the bore 48 is square-shaped, and a key of the same shape is used to rotate the spool 42 and initiate movement of the pivoting assembly 18. The upper cable 38 is adjusted to extend tautly when the end segment 14 is in the lowered position.

The lower cable 40 extends from the pivot arm 34 to a lower spool 50. The lower spool 50 is positioned nearer to the pivot arm 34 than is the upper spool 42 and, correspondingly, the length of the lower cable 40 need not be as long. The lower cable 40 is adjusted to extend tautly when the end segment 14 is in the raised position. The lower cable 40 and spool 50 otherwise are as described in detail above for the upper cable 38 and spool 42.

The upper cable 38 and spool 42 operate in cooperation with the lower cable 40 and spool 50 to initiate pivoting of the end segment 14 by pivoting the first pivot arm 34 about the pin 36 at the fixed pivot point. To move the end segment 14 into the raised position, the upper spool 42 is turned and the cable 38 wound about the spool 42, thereby pivoting the upper end of the pivot arm 34 over center and in the direction of the end segment 14. To drop the end segment 14 into the lowered position, the lower spool 50 is rotated and the cable 40 wound about the spool 50, thereby pivoting the lower end of the pivot arm 34 in the direction of the end segment 14.

The second, generally horizontal pivot arm 52 is pivotally connected at one end to the first pivot arm 34. The second pivot arm 52 is an elongated rod having an end clevis 54 at each end. A hinge pin 56 pivotally connects one end clevis 54 to the first pivot arm 34 at a position intermediate the upper end and the midpoint of the first pivot arm 34. The second pivot arm 52 extends longitudinally along the side of the deck 10 between the first pivot arm 34 and a cam mechanism 58 located at the end opposite the first pivot arm 34. A hinge pin 56 pivotally connects the opposite end clevis 54 to the cam mechanism 58.

The cam mechanism 58 is located adjacent the end segment 14 below the support surface 26 and positioned generally upright and parallel to the first pivot arm 34. The second pivot arm 52 is connected to the upper end of the cam mechanism. The opposite end of the cam mechanism 58 is pivotally mounted at a fixed pivot point to a support assembly 22. The upper end of the cam mechanism is rounded and slidably engages an L-shaped retainer 60.

The retainer 60 protrudes from the side of the lower support 28 of the end segment 14 and has an inner surface comprising a support surface 62 that is generally parallel to the plane of the deck 10 and a stop surface 64 that is generally perpendicular to the plane of the deck 10. The intersection 66 of the support and stop surfaces is curved. The retainer 60 is positioned at a desired location such that it limits movement of the cam mechanism 58 in the direction of the outer edge 30 of the end segment 14.

The combination of the support assembly 22, cam mechanism 58 and retainer 60 provide support for the end segment 14. When the end segment 14 is in the raised position, the cam mechanism 58 is approximately 10.5° over center in the direction of the edge 30 of the end segment 14 and positioned within the curved intersection 66 of the retainer 60 to limit slipping of the cam mechanism 58. This arrangement provides stable mechanical equilibrium.

The support assembly 22 on which the cam mechanism 58 is mounted is stationary and provides support for the end segment 14. Referring now to FIGS. 1, 3 and 4, the assembly 22 includes a clevis 70, an inverted L-shaped bracket 72 and a support gusset 74. The support gusset 74 is a plate defined by a horizontal bottom edge 80, two shorter, vertical side edges 82 and a stepped, inclined top edge 84. The top edge 84 has a tab 86 that extends upward from the gusset 74 and has a lip 88 projecting into the interior of the car below the end segment 14. At least a portion of the support gusset 74 is welded or otherwise mounted to the post 44 at a height below the deck 10. The gusset 74 extends longitudinally from the post 44 past the transverse pivot axis 17. The top edge 90 of the tab 86 is inclined at an angle corresponding to the angle of the end segment 14 in the lowered position. Thus, when the end segment 14 is pivoted into the lowered position, the lower support 28 of the end segment 14 engages the lip 88, and lip 88 limits further movement in the downward direction and provides support for the end segment 14.

The inverted L-shaped bracket 72 is welded or otherwise mounted to the side of the gusset 74 below the end segment 14. At least a portion of the longer arm 76 of the L-shaped bracket 72 is mounted to the support gusset 74, and the shorter arm 78 projects outwardly away from the deck 10. The clevis 70 is mounted on top of the shorter arm 76 of the L-shaped bracket 72 with the two side tabs 71, between which the lower end of the cam mechanism 58 is fixedly secured, of the clevis 70 extending upwardly.

The motion of the first pivot arm 34 as it pivots translates through the second pivot arm 52 to the cam mechanism 58. When the end segment 14 is raised and the upper end of the first pivot arm extends forward towards the end segment 14, the second pivot arm 52 and cam mechanism 58 also are in forward positions (FIG. 1). Pivoting the first arm 34 so that its lower end pivots towards the end segment, pulls the second arm 52 downwardly and back from the direction of the edge 30 of the end segment 14, which in turn, pivots the upper end of the cam mechanism 58 back from the end segment 14 (FIG. 2). As the upper end of the cam mechanism 58 pivots back, the end segment 14 is released from the raised position and lowers as the cam mechanism 58 slides along the support surface 62 of the retainer 60 until the end segment 14 comes to rest on the lip 88 of the support gusset 74.

The lock-out mechanism 24 on the deck arrangement prevents closing of the end doors of the rail car when the end segment 14 is lowered. The lock-out mechanism 24 is pivotally connected to the clevis 70 and comprises a pin 94 that extends through the side tabs 71 of the clevis 70. The pin 94 also extends through the lower end of the cam mechanism 58, which is positioned between the side tabs 71, and pivotally connects the cam mechanism 58 to the lock-out mechanism 24.

The lock-out mechanism 24 also comprises a finger 96 that extends generally perpendicular to the pin 94. When the end segment 14 is in the raised position, the finger points in a downward direction (FIG. 1), but when the end segment 14 is in the lowered position, the finger points outwardly toward the edge 30 of the end segment 14 (FIG. 2). Rotation of the cam mechanism 58 initiates rotation clothe finger 96 between positions.

As best seen in FIG. 5, the support assembly 22 and lock-out mechanism 24 are positioned at a fixed location along the side of the end segment 14 at or very near the angled outer edge 30. When the end segment 14 is in the raised position, the finger 96 is within the enclosure of the rail car. When the end segment 14 is lowered, however, the finger 96 projects outwardly into the path of the end door 92, or a component thereof, to limit further movement of the door into the closed position, as illustrated schematically by broken lines in FIG. 5.

In a second embodiment of the present invention, as illustrated in FIGS. 6–8, the pivoting assembly 98 generally comprises a support assembly 100 and a lever 102. This embodiment may be more superior to the first embodiment previously described, in terms of simplicity of design, which may provide benefits including decreased costs of manufacture. A pivoting assembly 98 is positioned adjacent to the deck 10 on each side to provide support for each side of the end segment 14.

A respective support assembly 100 is positioned at a fixed location adjacent each side of the upper deck 10, below the lower support 28, and includes a first support gusset 104, a second support gusset 106, and an operating cam 108. The first support gusset 104 is generally L-shaped with a square-shaped plate 114 having a lip 116 extending perpendicularly from one edge. The support assembly 100 is welded or otherwise mounted to the railcar post 44 along the lip 116 of the first support gusset 104.

The second support gusset 106 is a generally L-shaped bracket with a rectangular plate 118 having a lip 120 extending perpendicularly from one edge to the first gusset 104. The second support gusset 106 is positioned adjacent to the plate 114 of the first support gusset 104 such that the two plates 114. 118 are generally parallel to one another, with the lip 120 extending between the plates 114, 118.

The operating cam 108 is positioned between the two plates 114, 118 and is pivotally mounted with a hinge pin 122 or similar fastener at a fixed pivot point below the end segment 14. The operating cam 108 includes a first support surface 110 and a second support surface 112 both for engageably supporting the end segment 14. The angle between the two surfaces 110. 112 is less than 90° to provide the desired downwardly angled support surface for the end segment 14 in the lowered position.

The cam 18 slidably engages the end segment 14 in pivoting between a raised and a lowered position. To support the end segment 14 in the raised position (FIG. 6), the cam 108 is pivoted into the raised position, with the first support surface 110 facing upwardly, to provide a generally horizontal support surface for the end segment 14. To drop the end segment 14 into the lowered position (FIG. 7), the cam 108 is pivoted into the lowered position, with the second support surface 112 facing upwardly but angling downwardly toward the end of the railcar, to provide an angled support surface for the end segment 14. The edge 124 along which the first and second support surfaces 110, 112 intersect is rounded to allow the cam 108 to pivot smoothly between the raised and lowered positions.

The lever 102 facilitates manual pivoting of the operating cam 108. The lever 102 is secured to and extends from the operating cam 108 preferably opposite the first support surface 110. Rotation of the lever 102 initiates pivoting of the cam 108. Preferably, the lever rotates approximately 90° in a vertical plane generally parallel to the plane of the side edge of the deck 10. The lever 102 is positioned and configured to allow a person to grasp the lever 102 when it is desired to pivot the cam 108. When the end segment 14 is in the raised position, the lever 102 extends in a generally downward direction (FIG. 6). When it is desired to move the end segment 14 into the lowered position, the lever 102 is rotated upwardly in the direction of the end of the railcar (FIG. 7). Similarly, when it is desired to move the end segment 14 into the raised position, the lever 102 is rotated downwardly toward the middle of the railcar.

The lever 102 also provides a lock-out feature to prevent closing of the end doors of the rail car when the end segment 14 is in the lowered position. When the end segment 14 is in the raised position, the lever 102 projects in a downward direction, but when the end segment 14 is in the lowered position, the lever 102 projects outwardly toward the outermost edge 30 of the end segment 14 at the end of the railcar. Thus positioned, the lever 102 extends into the path of a component of the end door to limit movement of the end door past the lever 102 into a closed position. The lever 102 is of sufficient length to extend past the path through which the end doors of the railcar travel.

Numerous modifications to the deck hinge arrangement may be possible to further improve pivoting of the end segment, as well as loading of automobiles. Thus, modifications and variations in practice of the invention are expected to occur to those skilled in the art upon consideration of the foregoing detailed description of the invention. Although a preferred embodiment has been described above and illustrated in the accompanying drawings, there is no intent to limit the scope of the invention to this or any other particular embodiment. Consequently, any such modifications and variations are intended to be included within the scope of the following claims. The invention is described further and pointed out by the following claims.

What is claimed is:

1. A method of moving motor vehicles between a first deck of a first railcar and a second deck of a second railcar coupled to said first railcar, the first and second decks being at different elevations, comprising:

reducing the difference between the elevations of ends of the first and second decks by pivoting an end section of the first deck so that the end section angles toward the second deck; and transporting the motor vehicles from the first deck to the second deck over a bridge plate extending between said first and second decks after pivoting the end section, with said pivoted end section acting to reduce a slope of the bridge plate.

2. A method in accordance with claim 1 further comprising:
    operating a pivoting assembly for pivoting said end section of the first deck between a raised, generally horizontal position and lowered, angled position.

3. A method in accordance with claim 1 wherein said pivoting assembly is operated by winding a cable around a rotary mechanism to initiate rotation of a pivot arm assembly to further initiate movement of a cam mechanism for slidably supporting said end section.

4. A method in accordance with claim 2 wherein said pivoting assembly is operated by rotating a lever to initiate pivoting of a cam mechanism for slidably supporting said end section.

\* \* \* \* \*